(12) United States Patent
Atkinson et al.

(10) Patent No.: US 12,212,582 B2
(45) Date of Patent: Jan. 28, 2025

(54) CYBER DEFENSE SYSTEM

(71) Applicant: Senseon Tech Ltd, London (GB)

(72) Inventors: David Atkinson, London (GB); James Mistry, London (GB)

(73) Assignee: Senseon Tech Ltd, London (GB)

( * ) Notice: Subject to any disclaimer, the term of this patent is extended or adjusted under 35 U.S.C. 154(b) by 913 days.

(21) Appl. No.: 17/130,334

(22) Filed: Dec. 22, 2020

(65) Prior Publication Data

US 2021/0329016 A1    Oct. 21, 2021

Related U.S. Application Data

(63) Continuation of application No. PCT/EP2019/066479, filed on Jun. 21, 2019.

(30) Foreign Application Priority Data

Jun. 22, 2018 (GB) .................................... 1810294

(51) Int. Cl.
    *G06F 21/00* (2013.01)
    *H04L 9/40* (2022.01)

(52) U.S. Cl.
    CPC ...... *H04L 63/1416* (2013.01); *H04L 63/1425* (2013.01)

(58) Field of Classification Search
    CPC ............. H04L 63/1416; H04L 63/1425; H04L 63/1408; H04L 63/1441; H04L 63/145
    See application file for complete search history.

(56) References Cited

U.S. PATENT DOCUMENTS 8,131,846 B1   3/2012  Hernacki et al.
8,239,668 B1   8/2012  Chen et al.
              (Continued)

FOREIGN PATENT DOCUMENTS

EP   3772209 A1   2/2021
EP   3800863 A1   4/2021
              (Continued)

OTHER PUBLICATIONS

Balasubramaniyan et al., "An architecture for intrusion detection using autonomous agents." Proceedings 14th annual computer security applications conference (Cat. No. 98EX217). IEEE, 1998. 19 pages.

(Continued)

*Primary Examiner* — Ghazal B Shehni
(74) *Attorney, Agent, or Firm* — Knobbe, Martens, Olson & Bear, LLP

(57) ABSTRACT

In one aspect, a computer-implemented method of detecting network security threats comprises the following steps: receiving at an analysis engine events relating to a monitored network; analysing the received events to identify at least one event that meets a case creation condition and, in response, creating a case in an experience database, the case being populated with data of the identified at least one event; assigning a threat score to the created case based on the event data; matching at least one further event to the created case and populating the case with data of the at least one further event, the threat score assigned to that case being updated in response; and in response to the threat score for one of the cases meeting a significance condition, rendering that case accessible via a case interface.

19 Claims, 11 Drawing Sheets

(56) References Cited

U.S. PATENT DOCUMENTS

| | | |
|---|---|---|
| 9,069,954 B2 | 6/2015 | Anurag |
| 9,571,524 B2 | 2/2017 | Dotan et al. |
| 9,749,342 B1 | 8/2017 | Krage et al. |
| 9,767,663 B2 | 9/2017 | Reske |
| 9,773,112 B1 | 9/2017 | Rathor et al. |
| 9,800,605 B2 | 10/2017 | Baikalov et al. |
| 9,998,425 B2 | 6/2018 | Raman et al. |
| 10,091,235 B1 | 10/2018 | Kushwaha et al. |
| 10,104,118 B2 | 10/2018 | Wang et al. |
| 10,109,166 B1 | 10/2018 | Selinger et al. |
| 11,228,604 B2 | 1/2022 | Mistry et al. |
| 11,265,339 B1 | 3/2022 | Mistry |
| 2003/0070003 A1 | 4/2003 | Chong et al. |
| 2005/0050336 A1 | 3/2005 | Liang et al. |
| 2008/0155517 A1 | 6/2008 | Yan et al. |
| 2011/0173699 A1 | 7/2011 | Figlin et al. |
| 2012/0151588 A1 | 6/2012 | Wang et al. |
| 2012/0174228 A1 | 7/2012 | Giakouminakis et al. |
| 2012/0192003 A1 | 7/2012 | Akiyama et al. |
| 2012/0287793 A1* | 11/2012 | Monk ............ H04L 43/028 370/241 |
| 2013/0097660 A1 | 4/2013 | Pas et al. |
| 2013/0298192 A1 | 11/2013 | Kumar et al. |
| 2014/0165200 A1 | 6/2014 | Singla |
| 2015/0135262 A1 | 5/2015 | Porat et al. |
| 2015/0205956 A1 | 7/2015 | Sakurai et al. |
| 2015/0281287 A1 | 10/2015 | Gill et al. |
| 2015/0341376 A1 | 11/2015 | Nandy et al. |
| 2016/0006753 A1 | 1/2016 | McDaid et al. |
| 2016/0021056 A1 | 1/2016 | Chesla |
| 2016/0149887 A1 | 5/2016 | Katmor et al. |
| 2016/0232353 A1 | 8/2016 | Gupta et al. |
| 2016/0234241 A1 | 8/2016 | Talamanchi et al. |
| 2016/0285858 A1 | 9/2016 | Li et al. |
| 2016/0308898 A1 | 10/2016 | Teeple et al. |
| 2016/0344762 A1 | 11/2016 | Jou et al. |
| 2016/0373477 A1 | 12/2016 | Moyle et al. |
| 2016/0381049 A1 | 12/2016 | Akhani et al. |
| 2017/0063907 A1 | 3/2017 | Muddu et al. |
| 2017/0063917 A1 | 3/2017 | Chesla |
| 2017/0093902 A1 | 3/2017 | Roundy et al. |
| 2017/0124127 A1* | 5/2017 | Fitterer ............ G06F 16/24565 |
| 2017/0214702 A1 | 7/2017 | Moscovici et al. |
| 2017/0220801 A1 | 8/2017 | Stockdale et al. |
| 2017/0251012 A1 | 8/2017 | Stockdale et al. |
| 2017/0359376 A1 | 12/2017 | Evron et al. |
| 2018/0027006 A1 | 1/2018 | Zimmermann et al. |
| 2018/0041537 A1 | 2/2018 | Bloxham et al. |
| 2018/0046928 A1 | 2/2018 | Jang et al. |
| 2018/0091559 A1 | 3/2018 | Luger et al. |
| 2018/0123864 A1 | 5/2018 | Tucker et al. |
| 2018/0183680 A1 | 6/2018 | Chen et al. |
| 2018/0183940 A1 | 6/2018 | Kosseifi et al. |
| 2018/0212879 A1 | 7/2018 | Toit et al. |
| 2018/0255076 A1 | 9/2018 | Paine |
| 2018/0316705 A1* | 11/2018 | Tsironis ............ H04L 41/145 |
| 2018/0316713 A1 | 11/2018 | Tsironis |
| 2018/0316727 A1 | 11/2018 | Tsironis |
| 2018/0332062 A1 | 11/2018 | Ford |
| 2018/0375886 A1 | 12/2018 | Kirti et al. |
| 2019/0014141 A1 | 1/2019 | Segal et al. |
| 2019/0052659 A1 | 2/2019 | Weingarten et al. |
| 2019/0089678 A1 | 3/2019 | Lam et al. |
| 2019/0173917 A1 | 6/2019 | Sites |
| 2019/0220626 A1 | 7/2019 | LeMasters et al. |
| 2019/0258800 A1 | 8/2019 | Ladnai et al. |
| 2019/0260764 A1 | 8/2019 | Humphrey et al. |
| 2019/0260785 A1 | 8/2019 | Jenkinson et al. |
| 2019/0266324 A1 | 8/2019 | Edwards et al. |
| 2019/0332690 A1 | 10/2019 | Gutman et al. |
| 2019/0372934 A1* | 12/2019 | Yehudai ............ G06F 18/2321 |
| 2020/0143041 A1 | 5/2020 | Jung et al. |
| 2020/0186465 A1 | 6/2020 | Venkata et al. |
| 2020/0236120 A1 | 7/2020 | Monteil et al. |
| 2020/0244673 A1 | 7/2020 | Stockdale et al. |
| 2020/0274870 A1 | 8/2020 | Zinar et al. |
| 2020/0285737 A1 | 9/2020 | Kraus et al. |
| 2020/0372150 A1 | 11/2020 | Salem et al. |
| 2020/0396190 A1 | 12/2020 | Pickman et al. |
| 2021/0036002 A1 | 2/2021 | Lee |
| 2021/0064762 A1 | 3/2021 | Salji |
| 2021/0120027 A1 | 4/2021 | Dean et al. |
| 2021/0250365 A1 | 8/2021 | Atkinson et al. |
| 2021/0273691 A1 | 9/2021 | Huang et al. |
| 2021/0273949 A1 | 9/2021 | Howlett et al. |
| 2021/0273950 A1 | 9/2021 | Lawson |
| 2021/0273953 A1 | 9/2021 | Fellows et al. |
| 2021/0273957 A1 | 9/2021 | Boyer et al. |
| 2021/0273958 A1 | 9/2021 | McLean |
| 2021/0273959 A1 | 9/2021 | Salji |
| 2021/0273960 A1 | 9/2021 | Humphrey et al. |
| 2021/0273961 A1 | 9/2021 | Humphrey et al. |
| 2021/0273973 A1 | 9/2021 | Boyer et al. |
| 2021/0360027 A1 | 11/2021 | Boyer et al. |
| 2021/0397710 A1 | 12/2021 | Cohen et al. |
| 2022/0019659 A1 | 1/2022 | Salem et al. |

FOREIGN PATENT DOCUMENTS

| | | |
|---|---|---|
| KR | 20160011261 A | 2/2016 |
| WO | 2015191052 A1 | 12/2015 |
| WO | 2017160760 A1 | 9/2017 |
| WO | 2017160770 A1 | 9/2017 |
| WO | 2019038527 A1 | 2/2019 |
| WO | 2019243579 A1 | 12/2019 |
| WO | 2020021100 A1 | 1/2020 |
| WO | 2021171090 A1 | 9/2021 |
| WO | 2021171092 A2 | 9/2021 |
| WO | 2021171093 A1 | 9/2021 |
| WO | 2021171092 A3 | 10/2021 |
| WO | 2021236661 A1 | 11/2021 |
| WO | 2021236663 A1 | 11/2021 |

OTHER PUBLICATIONS

Extended European Search Report in European Patent Application No. 20217813.3 dated Jun. 28, 2021. 11 pages.

Snapp et al., "The {DIDS}(Distributed Intrusion Detection System) Prototype." {USENIX} Summer 1992 Technical Conference ({USENIX} Summer 1992 Technical Conference). 1992. 7 pages.

Caithness et al. "Anomaly detection for industrial big data." arXiv preprint arXiv: 1804.02998 (2018) 9 pages.

International Search Report and Written Opinion in International Application No. PCT/EP2020/078643, mailed Feb. 1, 2021, 21 pages.

Ranshous et al. "Anomaly detection in dynamic networks: a survey." Wiley Interdisciplinary Reviews: Computational Statistics 7.3 (2015): 223-247 26 pages.

Search Report under Section 17 in United Kingdom Patent Application No. GB2200435.2 dated Feb. 18, 2022, 4 pages.

Xie et al. "Fast low-rank matrix approximation with locality sensitive hashing for quick anomaly detection." IEEE Infocom 2017-IEEE Conference on Computer Communications. IEEE, 2017 10 pages.

Hindy et al., "A taxonomy of malicious traffic for intrusion detection systems." 2018 International Conference On Cyber Situational Awareness, Data Analytics And Assessment (Cyber SA). IEEE, 2018. 4 pages.

International Search Report and Written Opinion in International Patent Application No. PCT/EP2019/066479 mailed Oct. 9, 2019. 14 pages.

International Search Report and Written Opinion in International Patent Application No. PCT/EP2019/070256 mailed Oct. 24, 2019. 17 pages.

Extended European Search Report in European Patent Application No. 23170093.1 dated Jul. 7, 2023, 8 pages.

\* cited by examiner

CYBER DEFENSE SYSTEM

CROSS-REFERENCES TO RELATED APPLICATIONS

This application is a bypass continuation application of PCT Application No. PCT/EP2019/066479, filed Jun. 21, 2019, which PCT application in turn claims priority to GB Application No. 1810294.7, filed Jun. 22, 2018. Each of these applications is incorporated by reference herein in its entirety.

TECHNICAL FIELD

This disclosure relates to cyber defence.

BACKGROUND

Cyber defence refers to technologies that are designed to protect computer systems from the threat of cyberattacks. In an active attack, an attacker attempts to alter or gain control of system resources. In a passive attack, an attacker only attempts to extract information from a system (generally whilst trying to evade detection). Private computer networks, such as those used for communication within businesses, are a common target for cyberattacks. An attacker who is able to breach (i.e. gain illegitimate access to) a private network may for example be able to gain access to sensitive data secured within in it, and cause significant disruption if they are able to take control of resources as a consequence of the breach. A cyberattack can take various forms. A "syntactic" attack makes use of malicious software, such as viruses, worms and Trojan horses. A piece of malicious software, when executed by a device within the network, may be able to spread throughout the network, resulting in a potentially severe security breach. Other forms of "semantic" attack include, for example, denial-of-service (DOS) attacks which attempt to disrupt network services by targeting large volumes of data at a network; attacks via the unauthorized use of credentials (e.g. brute force or dictionary attacks); or backdoor attacks in which an attacker attempts to bypass network security systems altogether.

SUMMARY

Automated threat detection currently relies on making single observations that have a high confidence of being indicative of malicious activity. For example, identifying a particular byte pattern in a file or connection to a website not seen before. The problem with this is that for many threats, particularly unknown ones, there is simply no way to make single observations that identify the threat with sufficiently high confidence.

A solution to this problem is provided herein, in which observations (events) are associated with one another into "cases". This is achieved by associating events that are related by some common feature or group of features, e.g. time, device involved, user involved etc. and scoring the case as a whole according to how likely its constituent observations and their relationships are to correspond to malicious activity.

A first aspect of the present invention is directed to A computer-implemented method of detecting network security threats, the method comprising the following steps: receiving at an analysis engine events relating to a monitored network; analysing the received events to identify at least one event that meets a case creation condition and, in response, creating a case in an experience database, the case being populated with data of the identified at least one event; assigning a threat score to the created case based on the event data; matching at least one further event to the created case and populating the case with data of the at least one further event, the threat score assigned to that case being updated in response; and in response to the threat score for one of the cases meeting a significance condition, rendering that case accessible via a case interface.

Using this case-based analysis of relevant activity, cases can be built up over time in order to systematically collect and analyse information as threats develop. Cases that have been created from one or more observations may be given a low score initially because the confidence in the case relating to malicious activity is low. However, over time new observations may be added to a case. These may increase the confidence that the case relates to malicious activity.

In embodiments, the further event may be matched to the case based on respective timestamps of the further event and the case.

The further event may be matched to the case based on respective entity identifiers of the further event and the case.

Each of the entity identifiers may be: a user identifier, a device identifier, a network address, or an identifier of a process.

The events may comprise: (i) network events generated by monitoring network traffic within the network, and (ii) endpoint events generated using endpoint agents executed on endpoints of the network to monitor local activity at those endpoints.

The events may comprise joined events created by joining together network events and endpoint events.

The threat score for the case may be repeatedly updated as further events are received and matched to the case.

The at least one further event may comprise a subsequent event.

The at least one further event may comprise an earlier event.

The analysis may comprise matching the at least one event to a tactic associated with a known attack technique and creating the case in response.

The at least one further event may be matched to the case by matching the at least one further event to the same tactic.

The at least one further event may be matched to the case by matching the at least one further event to another tactic associated with the known attack technique.

The at least one further event may be matched to the case by matching the at least one further event to another attack technique associated with the known attack technique.

Information about a set of multiple cases may be rendered available via the case user interface in response to a determination that those cases (i) comprise matching entity identifiers, and (ii) meet a collective significance condition.

An enrichment process may be applied to the events, to augment the events with enrichment data prior to the analysis.

The enrichment may be performed in real-time.

The events may be stored in an observation database.

An enrichment process may be applied to the events in the observation database, to augment the events with enrichment data.

The enrichment process may be a batch enrichment process performed according to an enrichment schedule.

The analysis may be applied to a combination of events received from an event queue and events received from the observation database.

A first stage enrichment process may be applied to the events received from the event queue and a second stage enrichment process is applied to the events stored in the observation database.

At least one further event may be accessed from the observation database and matched to the case, wherein that further event is located by searching for events within a threat time window.

The length of the threat time window may be determined based on a type of attack associated with the case.

Another problem addressed by this disclosure is that, in current cybersecurity systems, intelligence known about threat types and threat actors is often predicated on assumptions made about infrastructure being targeted. However, this disclosure recognized that threats often manifest themselves on both a network and one or more of its endpoints. Another aspect of the invention provides a system that uses data from both endpoint systems and networks as a basis for cybersecurity analysis, for example to compile and score cases. This may be combined with other information such threat intelligence.

Another aspect of the invention is directed to a method of detecting security threats, the method comprising the following steps: receiving, at a data processing system, events relating to a monitored network, the events comprising (i) network events generated by monitoring network traffic within the network, and (ii) endpoint events generated using endpoint agents executed on endpoints of the monitored network to monitor local activity at those endpoints, wherein each of the network and endpoint events comprises: (i) event description data, (ii) an associated timestamp, and (iii) one or more related entity identifiers; processing the network and endpoint events to link each of at least some of the endpoint events to at least one of the network events, based on the timestamps and the entity identifiers in those events; and analysing the events to detect security threat conditions indicated by the events, wherein at least one security threat condition is detected based on an endpoint event and a network event to which the endpoint event has been linked.

This linking together of endpoint data with network data provides an extremely powerful basis for cyber security analysis. By linking such events together, it becomes possible to link inter-related endpoint and network activity for the purposes of analysis in a way that is not possible with the types of single point cyber defence solutions that are currently available.

In embodiments, at least some of the events may be linked by joining the events together, in a joining phase performed prior to the analysis.

The analysis may comprise creating, in an experience database, cases in response to the events, wherein at least some of the events are linked together by associating them with a common case.

The case may be populated with data of the events associated with it.

Each case may be assigned a threat score, the security threat conditions being detected based on the threat scores.

The method may comprise a step of standardizing the events according to a predetermined data model.

The one or more related entity identifiers may comprise one or more of: a network address, a user identifier, a device identifier, and an identifier of a process.

At least one of the endpoint events may be linked to at least one of the network events based on respective network connection identifiers in those events.

The event description data of the at least one endpoint event may associate at least one of the following with the network connection identifier: a socket on the endpoint, a host name of the endpoint, a process running on the endpoint, and a user account on the endpoint, which is thereby linked to the at least one network event.

The event description data of the endpoint event is thereby linked to the event description data of the network event, which may denote network activity associated with the identified network connection.

Each of those events may comprise multiple entity identifiers, which constitute the network connection identifier.

The multiple entity identity identifiers may be in the form of a five-tuple formed of: a source IP address, a source port, a destination IP address, a destination port and a transport protocol.

The method may comprise hashing the multiple entity identifiers in the events to create respective identifier hashes, wherein the events are linked based on the identifier hashes.

Another aspect of the invention provides a method of controlling a display to render a case interface page, the method comprising: accessing a set of interrelated events, the events relating to a monitored network, wherein each of the events comprises a timestamp and identifier of a related entity; and causing the display to render (i) a timeline of the events and (ii) a visual representation of the related entities identified in the events, wherein each of the events on the timeline is selectable, wherein selection of that event causes the visual representation to be modified so as to focus on one or more of the entities related to the selected event.

In embodiments, the entities may comprise network infrastructure components wherein the graphical representation is in the form of a network infrastructure map.

The set of events may be comprised in a case, having an associated threat score, which is displayed on the case interface page.

The case interface page may be rendered available in response to the threat score meeting a significance condition.

Another aspect of the invention provides a system for detecting security threats comprising an input configured to receive events and one or more processors configured to execute instructions, which cause the one or more processors to implement any of the methods or functions disclosed herein.

Another aspect of the invention provides a computer program comprising instructions stored on a computer-readable storage medium and configured, when executed on one or more processors, to implement any of the methods or functions disclosed herein.

BRIEF DESCRIPTION OF FIGURES

For a better understanding of the present invention and to show how embodiments of the same can be carried into effect, reference is made to the following figures in which.

DETAILED DESCRIPTION

Figure 1:
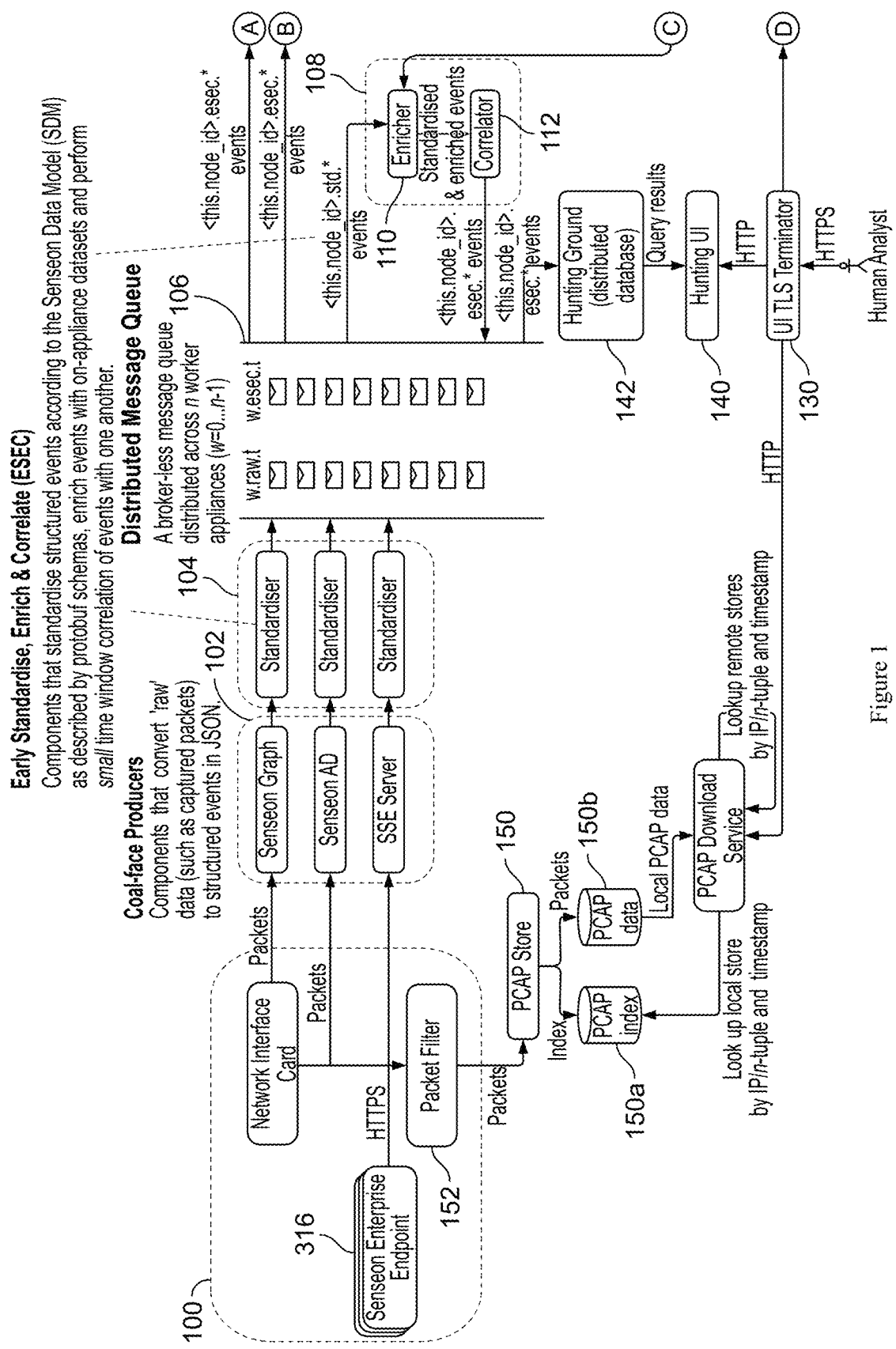
FIG. 1 shows a schematic function block diagram of a cyber defence platform.
Figure 1:
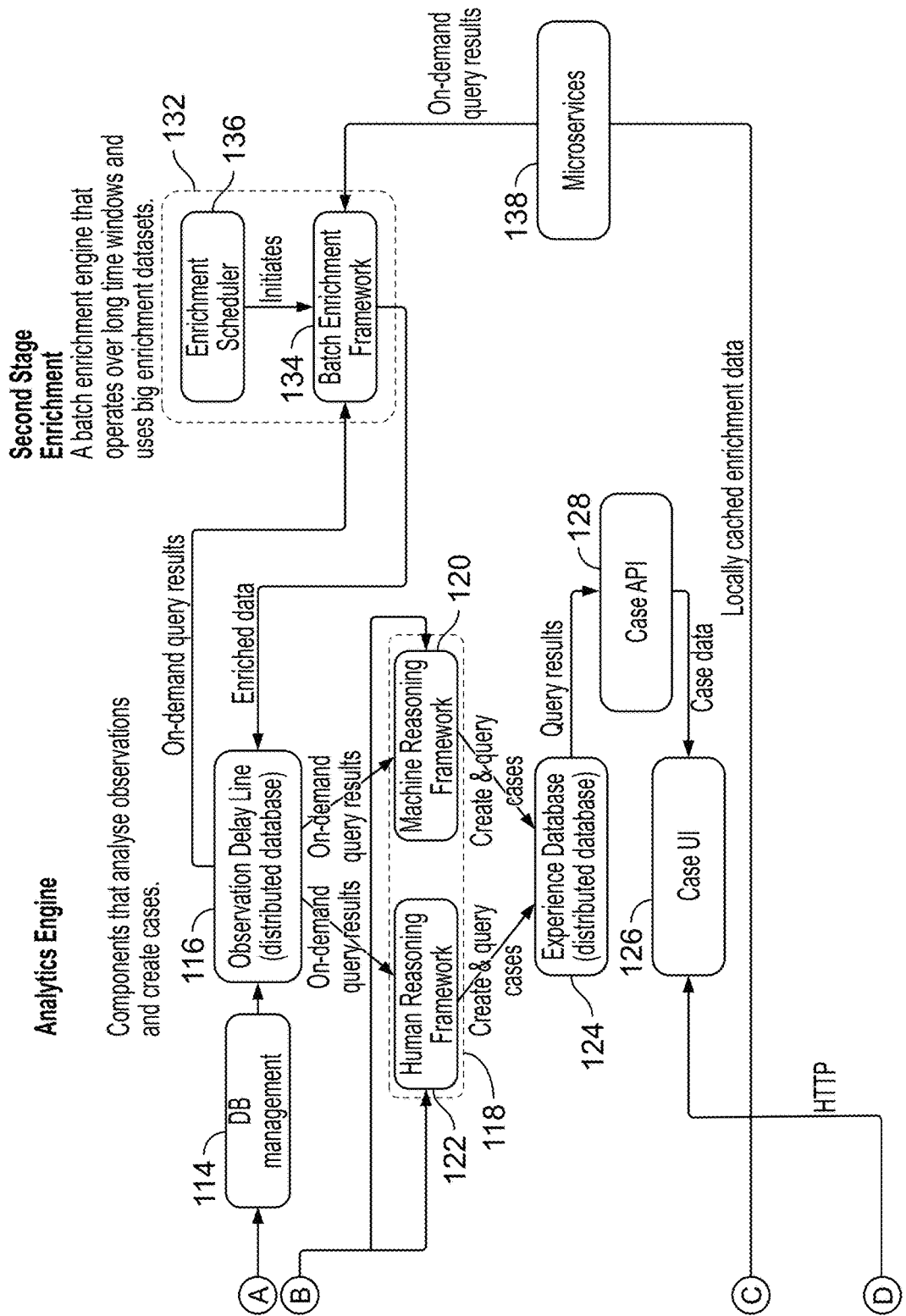

Many of the current cyber defence technologies are "single point solutions", each of which operates with a narrow focus on a specific cyber defence task. As a consequence, many critical systems are currently protected by a multitude of single point solutions that operate independently and disjointedly. This lack of coordination results in "blind spots" which attackers are able to exploit by bypassing the single point solutions individually. Over the years, attackers have developed numerous methods for bypassing single point cyber defence solutions, which makes these blind spots a significant source of vulnerability.

Another problem with existing cyber defence technologies is one of over-reporting. That is, where an excessive volume of alerts or warnings may be triggered by network activity which appears suspect according to a certain set of applied criteria, but which often turns out to be legitimate. This problem is exacerbated by the use of multiple single point solutions, and grows as the number of single point solutions in use grows. Moreover, where different solutions use different reporting systems, as is common, their outputs as a whole are even harder to manage and interpret meaningfully.

An integrated cyber defence platform is disclosed herein, which provides overarching protection for a network against cyberattacks, through a combination of comprehensive network and endpoint data collection and organization, and advanced analytics applied to the resulting output. The platform operates according to an "observation-hypothesis-action" model, as will now be described. This may also be referred to herein as triangulation.

A key feature of the platform it its ability to collect and link together different types of event, and in particular (i) network events and (ii) endpoint events. This occurs at various places within the system, as described below.

Network events are generated by collecting raw network data from components (sub-systems, devices, software components etc.) across a monitored network, and re-structuring the raw network data into network events. The raw network data can for example be obtained through appropriate network tapping, to provide a comprehensive overview of activity across the network.

Endpoint events are generated using dedicated endpoint monitoring software in the form of endpoint agents that are installed on endpoints of the network being monitored. Each endpoint agent monitors local activity at the endpoint on which it is installed, and feeds the resulting data (endpoint data) into the platform for analysis.

This combination of endpoint data with network data is an extremely powerful basis for cyber defence.

In a data optimization stage, observations are captured in the form of structured, timestamped events. Both network events and endpoint events are collected at this stage and enhanced for subsequent analysis. Events generated across different data collectors are standardized, as needed, according to a predefined data model. As part of the data optimization, first stage enrichment and joining is performed. This can, to some extent at least, be performed in real-time or near-real time (processing time of around 1 second or less). That is, network and endpoint events are also enriched with additional relevant data where appropriate (enrichment data) and selectively joined (or otherwise linked together) based on short-term temporal correlations. Augmentation and joining are examples of what is referred to herein as event enhancement.

In an analytics stage, these enhanced network events are subject to sophisticated real-time analytics, by an analysis engine. This includes the use of statistical analysis techniques commonly known as "machine learning" (ML). The analysis is hypothesis-based, wherein the likelihood of different threat hypotheses being true is assessed given a set of current or historic observations.

One component of this analysis is the consideration of longer-term temporal correlations between events, and in particular different types of event such as network and endpoint event. Events that appear to be related are grouped into "cases" over time, as they arrive at the analysis engine. A case corresponds to one or more threat hypotheses. Each case has at least one assigned threat score, denoting the threat level indicated by its constituent events.

The creation and subsequent population of cases is driven by the results of analysing incoming events. A case is created for at least one defined threat hypothesis in response to an event that is classed as potentially malicious, and populated with data of that event. That is, each case is created in response to a single event received at the analysis engine. It is noted however that the event that causes a case to be created can be a joined event, which was itself created by joining two or more separate events together, an enriched event, or both.

Once a case has been created, it may be populated with data of subsequently received events that are identified as related to the case in question (which again may be joined and/or augmented events) in order to provide a timeline of events that underpin the case.

A case may alternatively or additionally be populated with data of one or more earlier events (i.e. earlier than the event or events that triggered its creation). This is appropriate, for example, where the earlier event(s) is not significant enough in itself to warrant opening a case (e.g. because it is too common), but whose potential significance becomes apparent in the context of the event(s) that triggered the creation of the case.

An event itself does not automatically create a case. An event may be subject to analysis (which may take into account other data—such as other events and/or external datasets) and it is the result of this analysis which will dictate if it will culminate in the creation of a new case or update of an existing case. A case can be created in response to one event which meets a case creation condition, or multiple events which collectively meet a case creation condition.

The criteria according to which cases are created and subsequently populated based on incoming events can be formulated around the "Mitre ATT&CK framework" or any other structured source of attack knowledge, as described later.

Generally, the threat score for a newly-created case will be low, and it is expected that a large number of cases will be created whose threat scores never become significant (because the events driving those cases turn out to be innocuous). However, in response to a threat occurring within the network being monitored, the threat score for at least one of the cases is expected to increase as the threat develops.

Another key feature of the system is the fact that cases are only rendered available via a case user interface (UI) when their threat scores reach a significance threshold, or meet some other significance condition. In other words, although a large number of cases may be created in the background, cases are only selectively escalated to an analyst, via the case UI, when they become significant according to defined significance criteria.

Case escalation is the primary driver for actions taken in response to threats or potential threats.

The cyber defence platform is implemented as a set of computer programs that perform the data processing stages disclosed herein. The computer programs are executed on one or more processors of a data processing system, such as CPUs, GPUs etc.

FIG. 1 shows a schematic block diagram of the cyber defence platform, which is a system that operates to monitor traffic flowing through a network as well as the activity at and the state of endpoints of that network in order to detect and report security threats. The system is shown to comprise a plurality of data collectors 102 which are also referred to herein as "coal-face producers". The role of these components 102 is to collect network and endpoint data and, where necessary, process that data into a form suitable for cyber security, analysis. One aspect of this is the collection of raw network data from components of the network being monitored and convert that raw data into structured events (network events), as described above. The raw network data is collected based on network tapping, for example.

Event standardisation components 104 are also shown, each of which receives the events outputted from a respective one of the coal-face producers 102. The standardisation components 104 standardise these structured events according to a predefined data model, to create standardized network and endpoint events.

The raw network data that is collected by the coal-face producers 102 is collected from a variety of different network components 100. The raw network data can for example include captured data packets as transmitted and received between components of the network, as well as externally incoming and outgoing packets arriving at and leaving the network respectively.

Additionally, structured endpoint events are collected using endpoint agents 316 executed on endpoints throughout the network. The endpoint agents provide structured endpoint events to the coal-face producers 102 and those events are subject to standardization, enrichment and correlation as above.

This is described in further detail below, with reference to FIG. 3.

Once standardised, the network events are stored in a message queue 106 (event queue), along with the endpoint events. For a large-scale system, the message queue can for example be a distributed message queue. That is, a message queue 106 embodied as a distributed data storage system comprising a cluster of data storage nodes (not shown in FIG. 1).

An event optimisation system 108 is shown having an input for receiving events from the message queue 106, which it processes in real-time or near real-time to provide enhanced events in the manner described below. In FIG. 1, enhanced events are denoted w.esec.t, as distinct from the "raw" events (pre-enhancement) which are denoted w.raw.t. Raw events that are stored in the message queue 106 are shown down the left hand side of the message queue (these are the standardised, structured events provided by the standardisation components 104) whereas enhanced events are shown on the right hand side. However, it will be appreciated that this is purely schematic and that the events can be stored and managed within the message queue 106 in any suitable manner.

The event enhancement system 108 is shown to comprise an enrichment component 110 and a joining component 112. The enrichment component 106 operates to augment events from the message queue 106 with enrichment data, in a first stage enrichment. The enrichment data is data that is relevant to the event and has potential significance in a cybersecurity context. It could for example flag a file name or IP address contained in the event that is known to be malicious from a security dataset. The enrichment data can be obtained from a variety of enrichment data sources including earlier events and external information. The enrichment data used to enrich an event is stored within the event, which in turn is subsequently returned to the message queue 106 as described below. In this first stage enrichment, the enrichment data that is obtained is limited to data that it is practical to obtain in (near) real-time. Additional batch enrichment is performed later, without this limitation, as described below.

The joining component 112 operates to identify short-term, i.e. small time window, correlations between events. This makes use of the timestamps in the events and also other data such as information about entities (devices, processes, users etc.) to which the events relate. The joining component 112 joins together events that it identifies as correlated with each other (i.e. interrelated) on the timescale considered and the resulting joined user events are returned to the message queue 106. This can include joining together one or more network events with one or more endpoint events where appropriate.

In FIG. 1, the joining component 112 is shown having an output to receive enriched events from the enrichment component 110 such that it operates to join events, as appropriate, after enrichment. This means that the joining component 112 is able to use any relevant enrichment data in the enriched events for the purposes of identifying short-term correlations. However, it will be appreciated that in some contexts at least it may be possible to perform enrichment and correlation in any order or in parallel.

An observation database manager 114 (storage component) is shown having an input connected to receive events from the message queue 106. The observation database manager 114 retrieves events, and in particular enhanced (i.e. enriched and, where appropriate, joined) events from the message queue 106 and stores them in an observation delay line 116 (observation database). The observation delay line 116 may be a distributed database. The observation delay line 116 stores events on a longer time scale than events are stored in the message queue 106.

A batch enrichment engine 132 performs additional enrichment of the events in the observation delay line 116 over relatively long time windows and using large enrichment data sets. A batch enrichment framework 134 performs a batch enrichment process, in which events in the observation delay line 116 are further enriched. The timing of the batch enrichment process is driven by an enrichment scheduler 136 which determines a schedule for the batch enrichment process. Note that this batch enrichment is a second stage enrichment, separate from the first stage enrichment that is performed before events are stored in the observation delay line 116.

Figure 3:
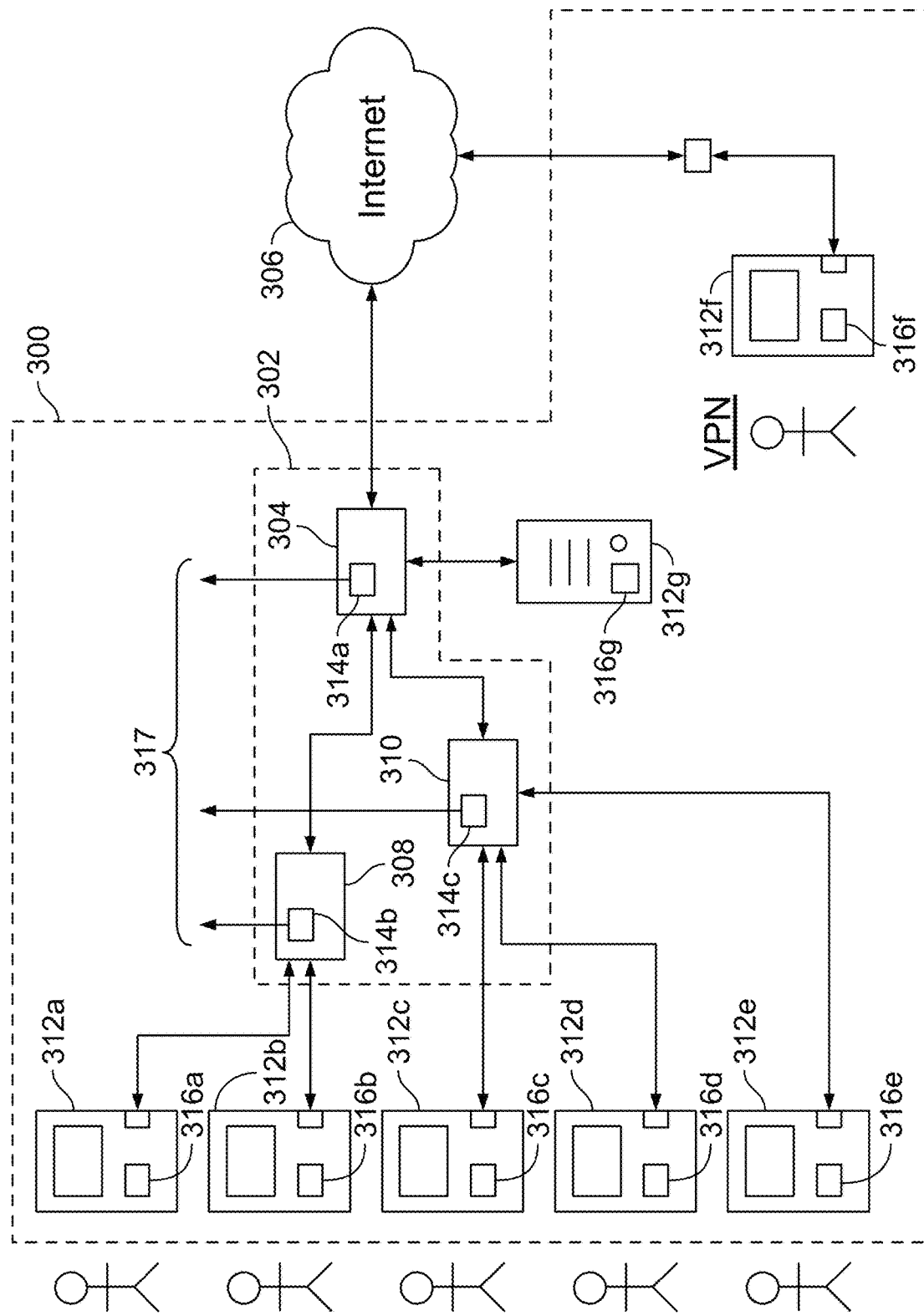
FIG. 3 shows a schematic block diagram of a network which may be subject to a cyber-security analysis.

Network and Endpoint Events:

FIG. 3 shows a schematic block diagram of an example network 300 which is subject to monitoring, and which is a private network. The private network 300 is shown to comprise network infrastructure, which can be formed of various network infrastructure components such as routers, switches, hubs etc. In this example, a router 304 is shown via which a connection to a public network 306 is provided such as the Internet, e.g. via a modem (not shown). This provides an entry and exit point into and out of the private network 300, via which network traffic can flow into the private network 300 from the public network 306 and vice versa. Two additional network infrastructure component 308, 310 are shown in this example, which are internal in that they only have connections to the public network 306 via the router 304. However, as will be appreciated, this is purely an example, and, in general, network infrastructure can be formed of any number of components having any suitable topology.

In addition, a plurality of endpoint devices 312a-312f are shown, which are endpoints of the private network 300. Five of these endpoints 312a-312e are local endpoints shown directly connected to the network infrastructure 302, whereas endpoint 312f is a remote endpoint that connects remotely to the network infrastructure 302 via the public network 306, using a VPN (virtual private network) connection or the like. It is noted in this respect that the term endpoint in relation to a private network includes both local endpoints and remote endpoints that are permitted access to the private network substantially as if they were a local endpoint. The endpoints 312a-312f are user devices operated by users (client endpoints), but in addition one or more server endpoints can also be provided. By way of example, a server 312g is shown connected to the network infrastructure 302, which can provide any desired service or services within private network 300. Although only one server is shown, any number of server endpoints can be provided in any desired configuration.

For the purposes of collecting raw network data, a plurality of network data capture component 314a-314c are provided. These can for example be network taps. A tap is a component which provides access to traffic flowing through the network 300 transparently, i.e. without disrupting the flow of network traffic. Taps are non-obtrusive and generally non-detectable. A tap can be provided in the form of a dedicated hardware tap, for example, which is coupled to one or more network infrastructure components to provide access to the raw network data flowing through it. In this example, the taps 314a, 314b and 314c are shown coupled to the network infrastructure component 304, 308 and 310 respectively, such that they are able to provide, in combination, copies 317 of any of the raw network data flowing through the network infrastructure 302 for the purposes of monitoring. It is this raw network data that is processed into structured network events for the purpose of analysis.

Figure 2:
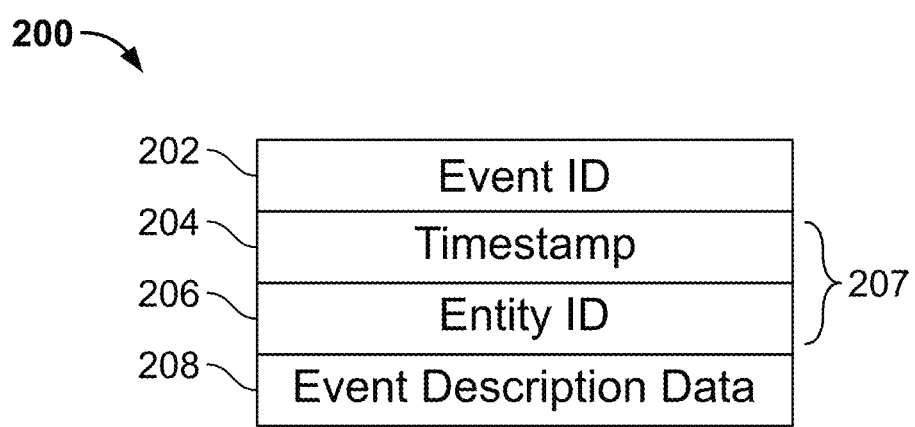
FIG. 2 shows a highly schematic representation of a network event.

FIG. 2 shows a schematic illustration of certain high level structure of a network event 200.

The network event 200 is shown to comprise a timestamp 204, an entity ID 206 and network event description data (network event details) 208. The timestamp 204 and entity ID 206 constitute metadata 207 for the network event details 208.

The network event description data 208 provides a network event description. That is, details of the activity recorded by the network event that has occurred within the network being monitored. This activity could for example be the movement of a network packet or sequence of network packets through infrastructure of the network, at a particular location or at multiple locations within the network.

The network event data 208 can for example comprise one or more network event type indicators identifying the type of activity that has occurred. The entity ID 206 is an identifier of an entity involved in the activity, such as a device, user, process etc. Where multiple entities are involved, the network event can comprise multiple network event IDs. Two important forms of entity ID are device ID (e.g. MAC address) and network address (e.g. IP address, transport address (IP address plus port) etc.), both of which may be included in a network event.

As well as being used as part of the analysis (in conjunction with the timestamps 204), entity IDs 206 and network event description data 208 can be used as a basis for querying enrichment data sources for enrichment data.

The timestamp 204 denotes a timing of the activity by the network event 200. Such timestamps are used as a basis for associating different but related network events, together with other information in the network event 200 such as the entity ID 206 or IDs it contains.

The network event 200 can have structured fields in which this information is contained, such as a timestamp field, one or more entity ID fields and one more network event description fields.

The network event 200 is shown to comprise a network event identifier (ID) 202 which uniquely identifies the network event 200.

Returning to FIG. 3, for the purpose of collecting endpoint data, endpoint monitoring software (code) is provided which is executed on the endpoints of the network 300 to monitor local activity at those endpoints. This is shown in the form of endpoint agents 316a-316g (corresponding to endpoint agents 316 in FIG. 1) that are executed on the endpoints 312a-312g respectively. This is representative of the fact that endpoint monitoring software can be executed on any type of endpoint, including local, remote and/or server endpoints as appropriate. This monitoring by the endpoint agents is the underlying mechanism by which endpoint events are collected within the network 300.

Figure 4:
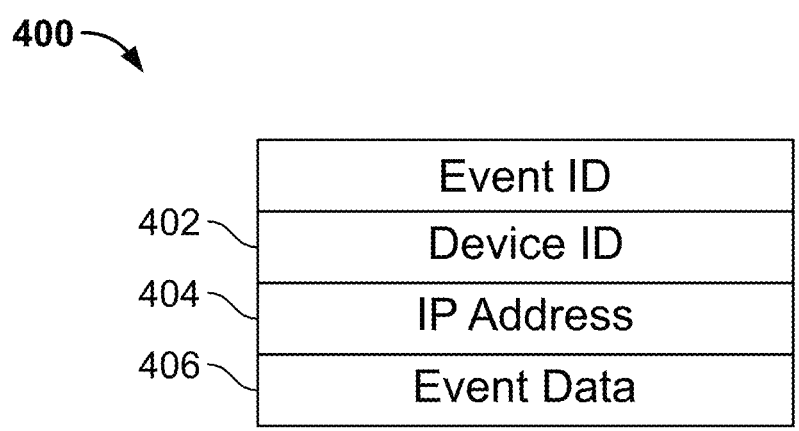
FIG. 4 shows a highly schematic representation of an endpoint event.

FIG. 4 shows a schematic illustration of a certain high level structure of an endpoint event 400.

The endpoint event 400 is shown to comprise at least one endpoint identifier, such as a device identifier (e.g. MAC address) 402 and network (e.g. IP) address 404 of the endpoint to which it relates, and endpoint event description data 406 that provides details of the local activity at the endpoint in question that triggered the creation of the endpoint event 400.

One example of endpoint activity that may be valuable from a cyber defence perspective is the opening of a connection at an endpoint. For example, a TCP/IP connection is uniquely defined by a five-tuple of parameters: source IP address (IP address of the endpoint being monitored), source port, destination IP address (IP address of an e.g. external endpoint to which the connection is being opened), destination port, and protocol. A useful endpoint event may be generated and provided to the platform for analysis when an endpoint opens a connection, in which the five-tuple defining the connection is recorded, and well as, for example, an indication of a process (application, task, etc.) executed on the endpoint that opened the connection.

As noted, one of the key features of the present cyber defence platform is its ability to link together interrelated network and endpoint events. Following the above example, by linking and endpoint event recording the opening of a connection and details of the process that opened it to network events recording the flow of traffic along that connection, it becomes possible to link specific flows of network traffic to that specific process on that endpoint.

Additional examples of endpoint information that can be captured in endpoint events include information about processes running on the endpoint (a process is, broadly, a running program), the content of files on the endpoint, user accounts on the endpoint and applications installed on the endpoint. Again, such information can be linked with any corresponding activity in the network itself, to provide a rich source of information for analysis.

Such linking can occur within the platform both as part of the real-time joining performed by the joining component 112.

However, network and endpoint events can also be linked together as part of the analysis performed by the analysis engine that is inherently able to consider links between events over longer time-scales, as will now be described.

Event Driven, Case-Based Analysis:

Returning to FIG. 1, the analysis engine, labelled 118, is shown having inputs connected to the event queue 106 and the observation delay line 116 for receiving events for analysis. The events received at the analysis engine 118 from the event queue 106 directly are used, in conjunction with the events stored in the observation delay line 116, as a basis for a sophisticated cyber security analysis that is applied by the analysis engine 118. Queued events as received from the message queue 106 permit real-time analysis, whilst the observation database 116 provides a record of historical events to allow threats to be assessed over longer time scales as they develop.

The analysis applied by analysis engine 118 is an event-driven, case-based analysis as will now be described.

As indicated above, the analysis is structured around cases herein. Cases are embodied as case records that are created in an experience database 124 (which may also be a distributed database).

Case creation is driven by events that are received at the analysis engine from the message queue 106, in real-time or near-real time.

Case creation can also be driven by events that are stored in the observation delay line 116. For example, it may be that an event is only identified as potentially threat-related when that event has been enriched in the second stage enrichment.

Once created, cases are developed by matching subsequent events received from the message queue 106 to existing cases in the experience database 124.

Events stored in the observation delay line 116 may also be matched to existing cases. For example, it may be that the relevance of a historic event only becomes apparent when a later event is received.

Thus, over time, a significant case will be populated with a time sequence of interrelated events, i.e. events that are potentially related to a common security threat, and as such exhibit a potential threat pattern.

Incoming events can be matched to existing cases using defined event association criteria, as applied to the content of the events—in particular the timestamps, but also other information such as entity identifiers (device identifier, IP address etc.). These can be events in the event queue 106, the observation delay line 116, or spread across both. Three key pieces of metadata that are used as a basis for linking events in this way are:
1. timestamps,
2. endpoint devices, and/or specific endpoint information such as:
   a. endpoint host name
   b. endpoint open sockets
3. IP address.

These can be multiple pieces of metadata of each type, for example source and destination IP addressed. Such metadata of cases is derived from the event or events on which the case is based. Note the above list is not exhaustive, and the types of data can be used as a basis for event linking.

For example, events may be associated with each other based on IP address where a source IP address in one event matches a destination IP address in another, and those events are within a given time window. IP addresses provide one mechanism by which endpoint events can be matched with related network events.

As another example, open sockets on an endpoint are a valuable piece of information in this context, as they are visible to the endpoint agent on the endpoint and associate specific processes running on that endpoint with specific network connections ("conversations"). That is, a socket associated with a process running on an endpoint (generally the process that opened the socket) can be associated with a specific five-tuple at a particular moment in time. This in turn can be matched to network activity within that conversation, for example by matching the five-tuple to the header data of packets tapped from the network. This in turn allows that network activity to be matched to a specific socket and the process associated with it. The endpoint itself can be identified by host name, and the combination of host name, five tuple and time is unique (and in many cases the five tuple and time will be unique depending on the network configuration and where the communication is going). This may also make use of the time-stamps in the network and endpoint events, as the association between sockets and network connections is time limited, and terminates when a socket is closed.

As noted already, in networking, a five-tuple is a tuple of (source IP, destination IP, source port, destination port, transport protocol). This uniquely identifies a network connection within relatively small time windows. In order to match events based on network connection, a hash of the five tuple can be computed from all network data and from endpoint process connection data (data relating to the network conversations individual processes on the endpoint are engaged in). By ensuring that all endpoint data also contains the host name (derived from the endpoint software), this allows any network event to be correlated with any endpoint event (network 5 tuple hash→endpoint 5 tuple hash→host name) and vice versa. This provides an efficient mechanism for linking specific network connections to specific programs (processes). Such techniques can also be used to link network activity to other event description data, e.g. a specific user account on an endpoint.

As noted, each case is assigned at least one threat score, which denotes the likelihood of the threat hypothesis (or threat hypotheses) to which the case relates. Significance in this context is assessed in terms of threat scores. When the threat score for a case reaches a significance threshold or meets some other significance condition, this causes the case to be rendered accessible via a case user interface (UI) 126.

Access to the cases via the case UI 126 is controlled based on the threat scores in the case records in the experience database 124. A user interface controller (not shown) has access to the cases in the experience database 124 and their threat scores, and is configured to render a case accessible via the case UI 126 in response to its threat score reaching an applicable significance threshold.

Such cases can be accessed via the case UI 126 by a human cyber defence analyst. In this example, cases are retrieved from the experience database 124 by submitting query requests via a case API (application programming interface) 128. The case (UI) 126 can for example be a web interface that is accessed remotely via an analyst device 130.

Thus within the analysis engine there are effectively two levels of escalation:
1. Case creation, driven by individual events that are identified as potentially threat-related.
2. Escalation of cases to the case UI 126, for use by a human analyst, only when their threat scores become significant, which may only happen when a time sequence of interrelated events has been built up over time As an additional safeguarding measure, the user interface controller may also escalate a series of low-scoring cases related to a particular entity to the case UI 126. This is because a series of low-scoring cases may represent suspicious activity in themselves (e.g. a threat that is evading detection). Accordingly, the platform allows patterns of low-scoring cases that are related by some common entity (e.g. user) to be detected, and escalated to the case UI 126. That is, information about a set of multiple cases is rendered available via the case US 126, in response to those cases meeting a collective significance condition (indicating that set of cases as a whole is significant).

The event-driven nature of the analysis inherently accommodates different types of threats that develop on different time scales, which can be anything from seconds to months. The ability to handle threats developing on different timescales is further enhanced by the combination or real-time and non-real time processing within the system. The real-time enrichment, joining and providing of queued events from the message queue 106 allows fast-developing threats to be detected sufficiently quickly, whilst the long-term storage of events in the observation delay line 116, together with batch enrichment, provide a basis for non-real time analysis to support this.

The above mechanisms can be used both to match incoming events from the message queue 106 and events stored in the observation delay line 116 (e.g. earlier events, whose relevance only becomes apparent after later event(s) have been received) to cases. Appropriate timers may be used to determine when to look for related observations in the observation delay line 116 based on the type of observation, after an observation is made. Depending on the attacker techniques to which a particular observation relates, there will be a limited set of possible related observations in the observation delay line 116. These related observations may only occur within a particular time window after the original observation (threat time window). The platform can use timers based on the original observation type to determine when to look for related observations. The length of the timer can be determined based on the threat hypothesis associated with the case.

Analysis Framework:

The analysis engine is shown to comprise a machine reasoning framework 120 and a human reasoning framework 122. The machine reasoning framework 120 applies computer-implemented data analysis algorithms to the events in the observation delay line 116, such as ML techniques.

Individual observations may be related to other observations in various ways but only a subset of these relationships will be meaningful for the purpose of detecting threats. The analysis engine 118 uses structured knowledge about attacker techniques to infer the relationships it should attempt to find for particular observation types.

This can involve matching a received event or sets of events to known tactics that are associated with known types of attack (attack techniques). Within the analysis engine 118, a plurality of analysis modules ("analytics") are provided, each of which queries the events (and possibly other data) to detect suspicious activity. Each analytic is associated with a tactic and technique that describes respective activity it can find. A hypothesis defines a case creation condition as a "triggering event", which in turn is defined as a specific analytic result or set of analytic results that triggers the creation of a case (the case being an instance of that hypothesis). A hypothesis also defines a set of possible subsequent or prior tactics or techniques that may occur proximate in time to the triggering events (and related to the same, or some of the same, infrastructure) and be relevant to proving the hypothesis. Because each hypothesis is expressed as tactics or techniques, there may be many different analytics that can contribute information to a case. Multiple hypotheses can be defined, and cases are created as instances of those hypotheses in dependence on the analysis of the events. Tactics are high level attacker objectives like "Credential Access", whereas techniques are specific technical methods to achieve a tactic. In practice it is likely that many techniques will be associated with each tactic.

For example, it might be that after observing a browser crashing and identifying it as a possible symptom of a "Drive-by Compromise" technique (and creating a case in response), another observation proximate in time indicating the download of an executable file may be recognized as additional evidence symptomatic of "Drive-by Compromise" (and used to build up the case). Drive-by Compromise is one of a number of techniques associated with an initial access tactic.

As another example, an endpoint event may indicate that an external storage device (e.g. USB drive) has been connected to an endpoint and this may be matched to a potential a "Hardware Additions" technique associated with the initial access tactic. The analysis engine 118 then monitors for related activity such as network activity that might confirm whether or not this is actually an attack targeting the relevant infrastructure.

This is performed as part of the analysis of events that is performed to create new cases and match events to existing cases. As indicated, this can be formulated around the "MITRE ATT&CK framework". The MITRE ATT&CK framework is a set of public documentation and models for cyber adversary behaviour. It is designed as a tool for cyber security experts. In the present context, the MITRE framework can be used as a basis for creating and managing cases. In the context of managing existing cases, the MITRE framework can be used to identify patterns of suspect (potentially threat-related behaviour), which in turn can be used as a basis for matching events received at the analysis engine 118 to existing cases. In the context of case creation, it can be used as a basis for identifying suspect events, which in turn drives case creation. This analysis is also used as a basis for assigning threat scores to cases and updating the assigned threat scores as the cases are populated with additional data. However it will be appreciated that these principles can be extended to the use of any structured source of knowledge about attacker techniques. The above examples are based on tactics and associated techniques defined by the Mitre framework.

Case Content:

Each case record is populated with data of the event or events which are identified as relevant to the case. Preferably, the events are captured within the case records such that a timeline of the relevant events can be rendered via the case UI 126. A case provides a timeline of events that have occurred and a description of why it is meaningful, i.e. a description of a potential threat indicated by those events.

In addition to the event timeline, a case record contains attributes that are determined based on its constituent events. Four key attributes are:
1. people (users)
2. processes
3. devices
4. network connections A case record covering a timeline of multiple events may relate to multiple people, multiple devices and multiple users. Attribute fields of the case record are populated with these attributed based on its constituent events.

A database case schema dictates how cases are created and updated, how they are related to each other, and how they are presented at the case UI 126.

Figure 5:
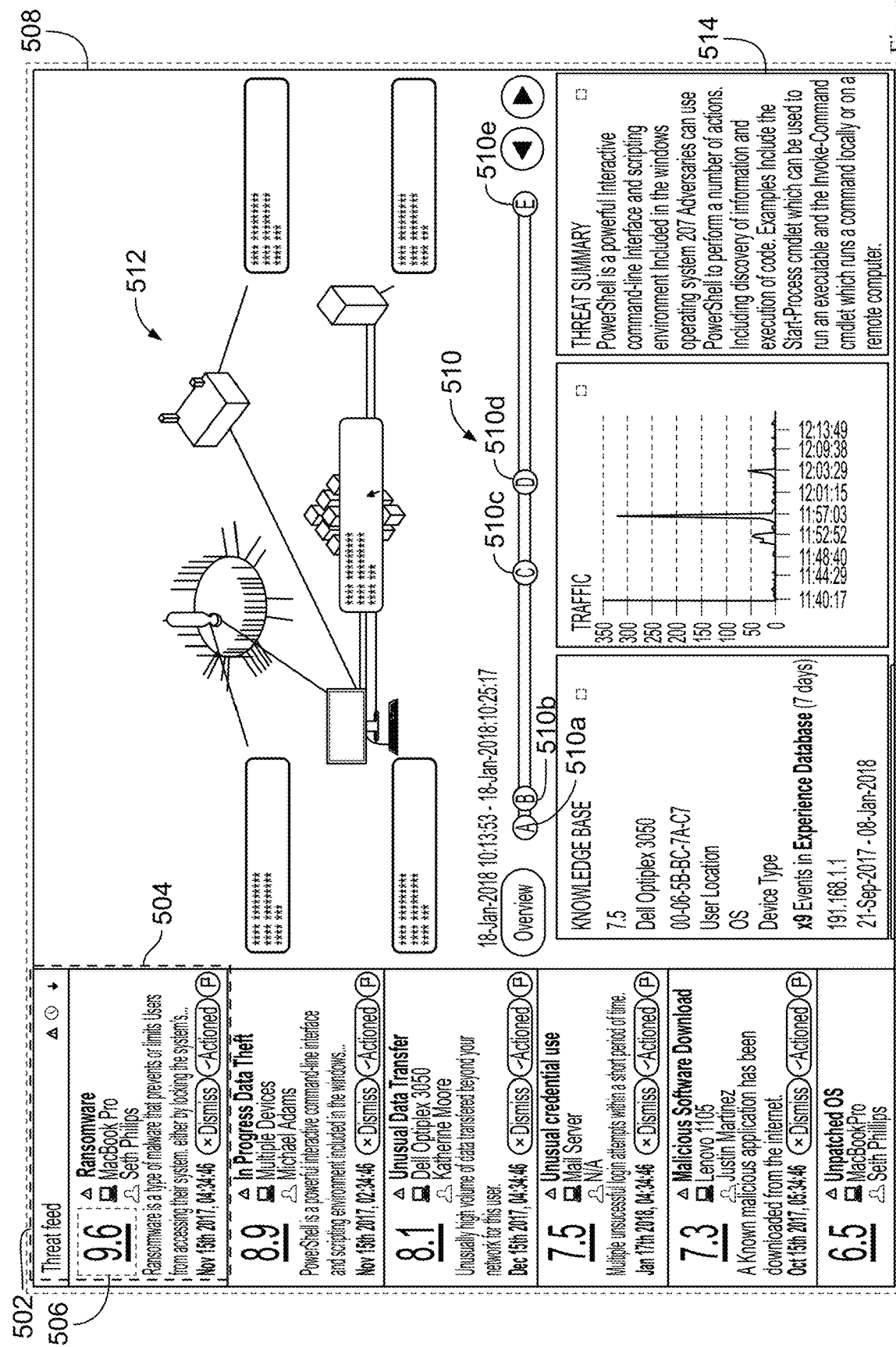
FIG. 5 shows an example layout of a case user interface.
Figure 5A:
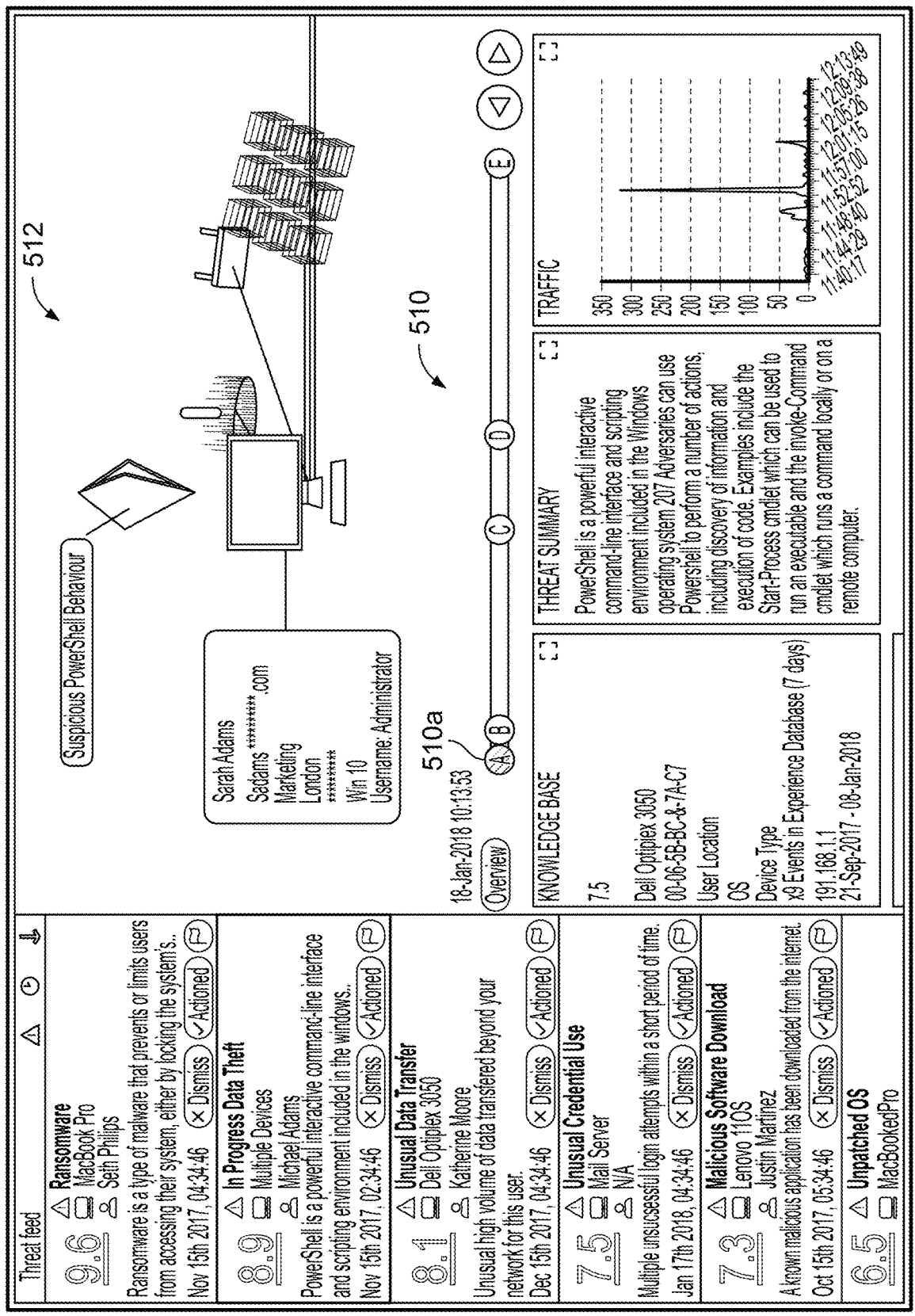
FIGS. 5a to 5e shows a case user interface dynamically responding to a series of user inputs.
Figure 5B:
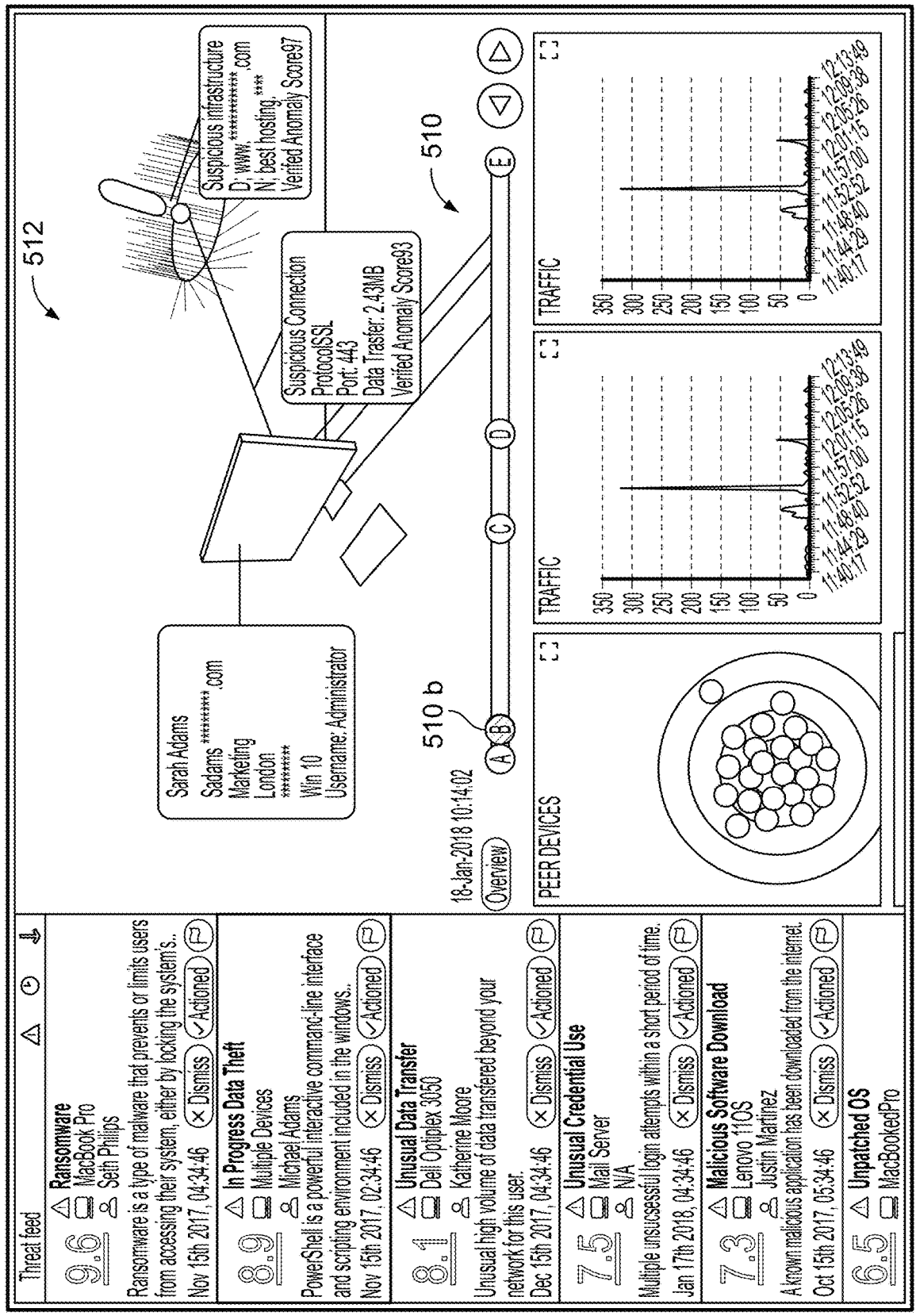
Figure 5C:
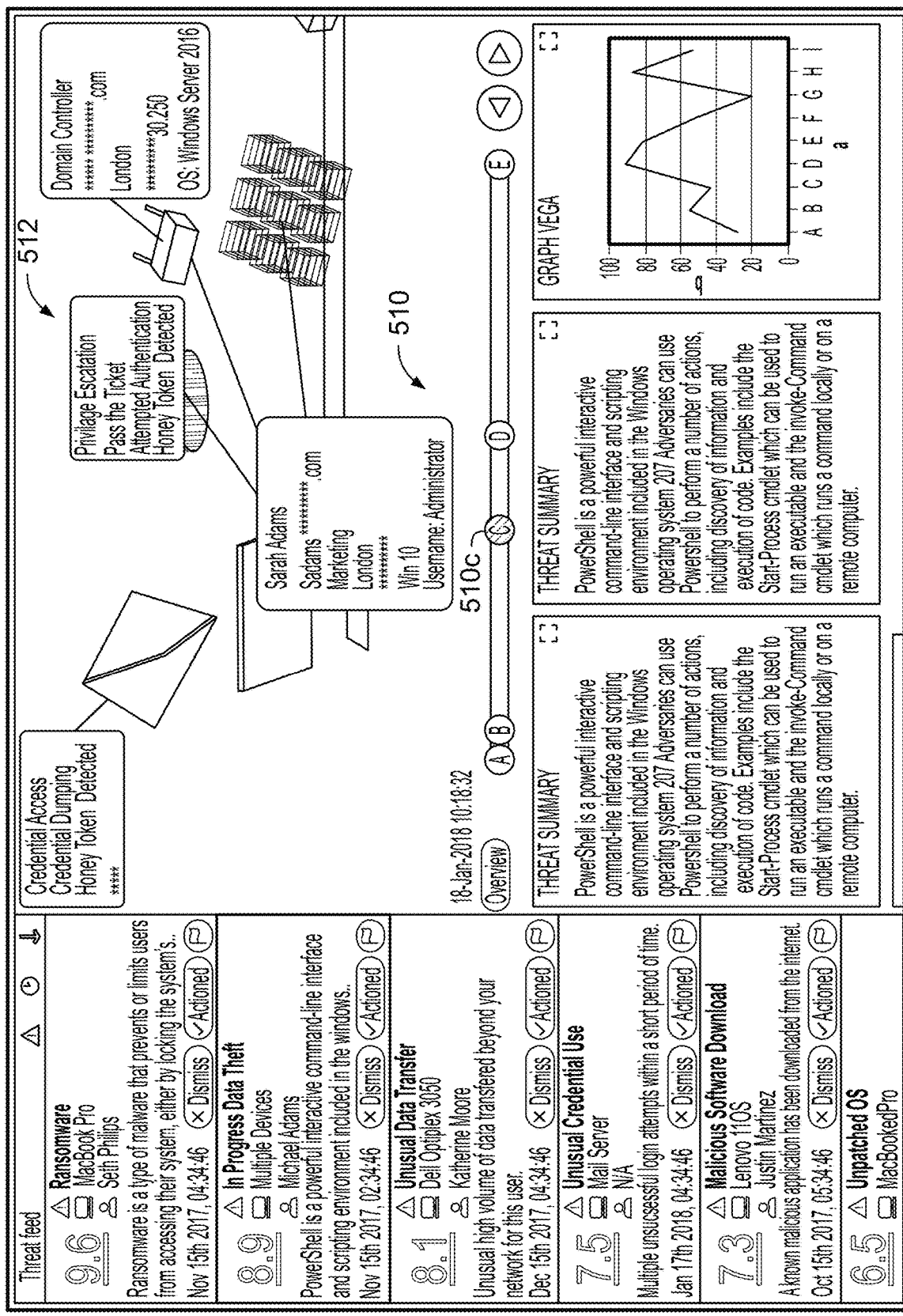
Figure 5D:
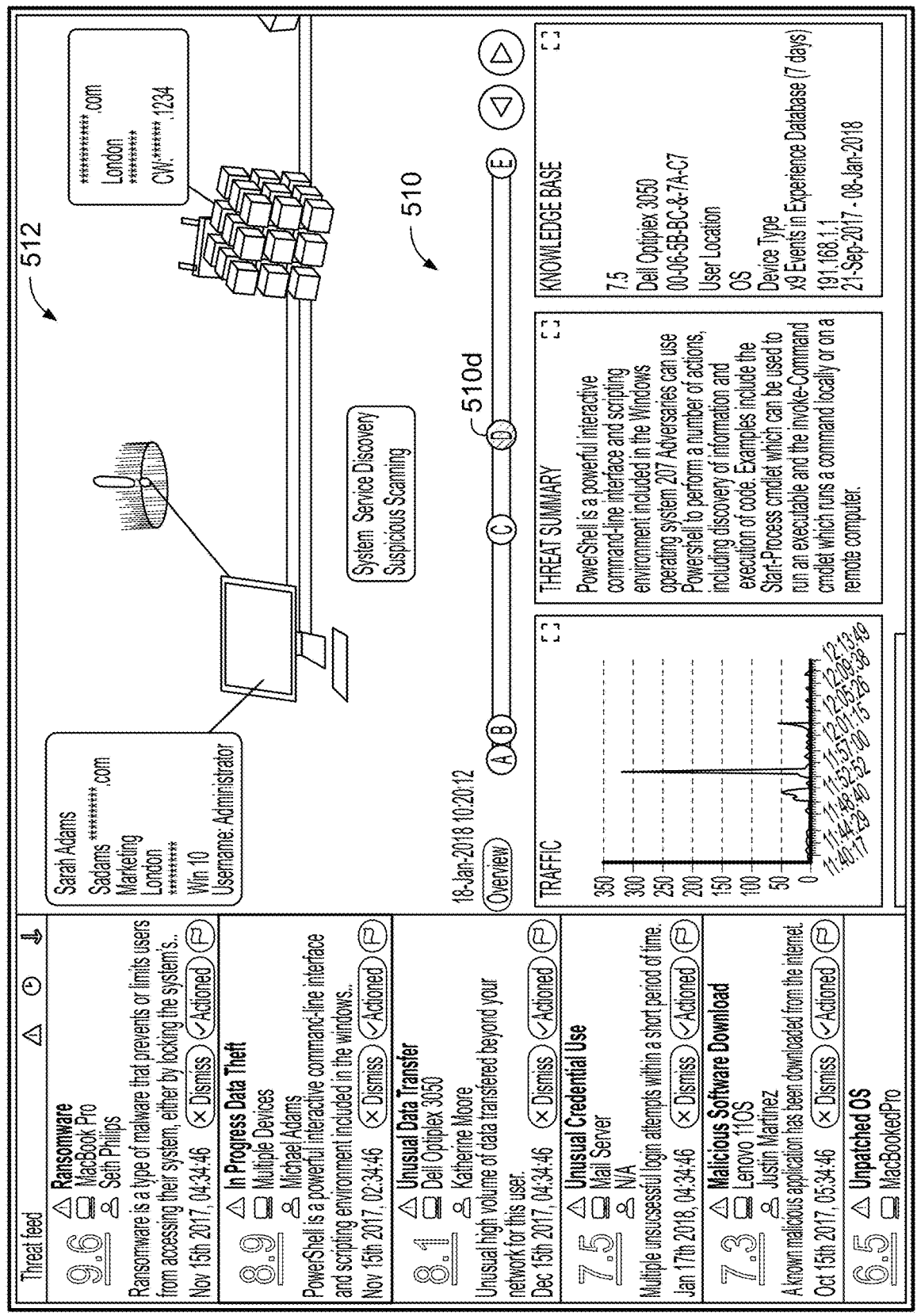
Figure 5E:
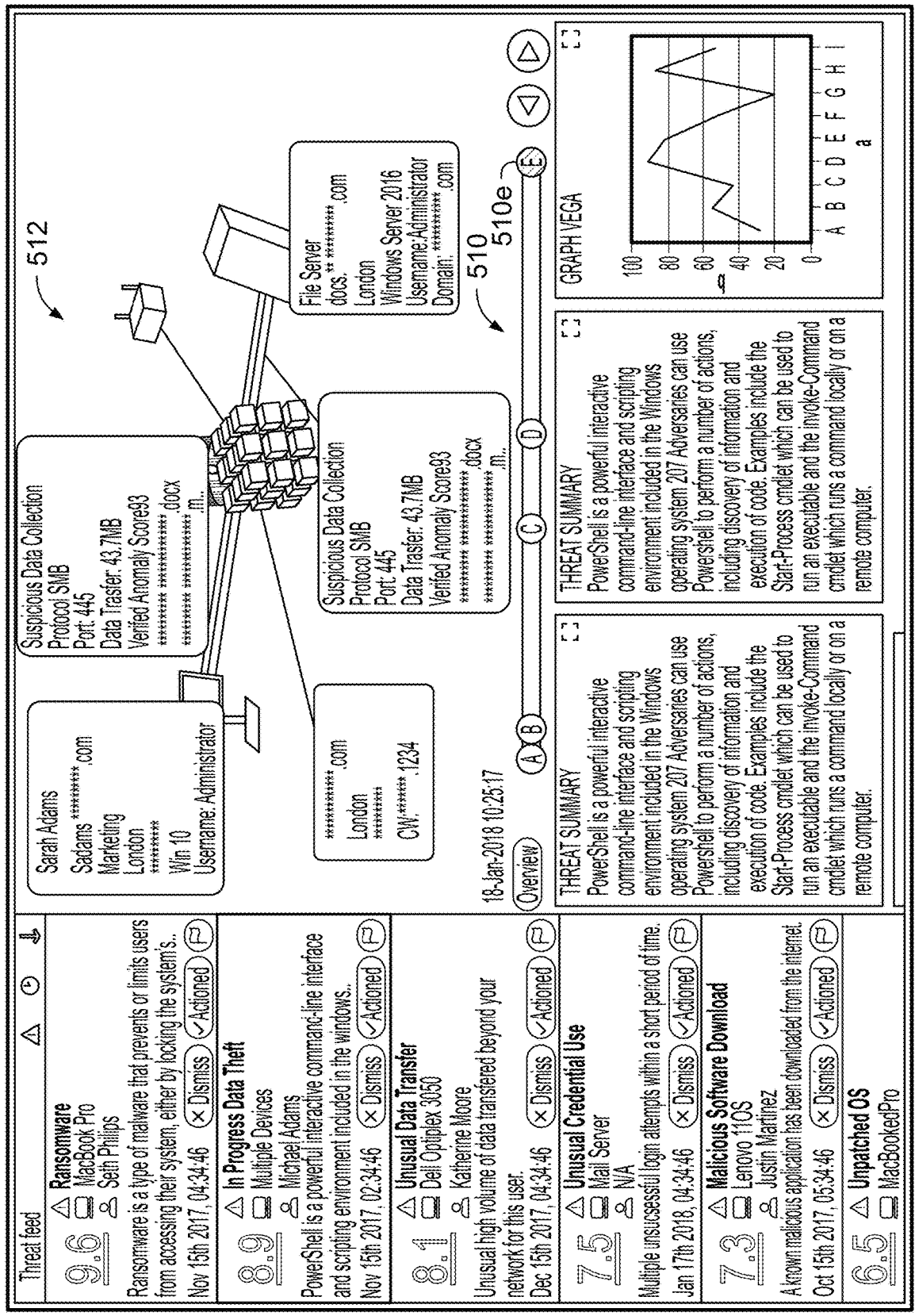

Case User Interface:

FIG. 5 shows an example of a page rendered by the case UI 126 at the analyst device 130. A list of cases 502 is shown, each of which is selectable to view further details of the case in question. Cases are only displayed in the case list 502 if their respective threats scores have reached the required thresholds. The cases in the case list 502 are shown ordered according to threat score. By way of example, the first case 504 in the case list 502 has a threat score of 9.6 (labelled as element 506). Further details of the currently selected case are shown in a region 508 adjacent to the case list 502. In particular, a timeline 510 of the events on which the case is based is shown. That is, the events with which the case is populated in the experience database 124. In addition, a graphical illustration 512 of network components to which those events relate is shown in association with the timeline 510. This can, for example, include endpoints, infrastructure components, software components and also external components which components of the network are in communication with. Additional information that is relevant to the case is also shown, including a threat summary 514 that provides a natural language summary of the threat to which the case relates. This additional information is provided in the form of "widgets" (separable threat information elements), of which the threat summary 514 is one.

As shown in FIGS. 5A through 5E, the timeline 510 comprises selectable elements corresponding to the underlying events, which are labelled 510a to 510e respectively. This can be seen, selecting these timeline elements causes the accompanying graphical representation 512 to be updated to focus on the corresponding network components. The widgets below the timeline are also updated to show the information that is most relevant to the currently selected timeline element.

Enrichment Micro Services:

Returning to FIG. 1, micro services 138 are provided, from which enrichment data can be obtained, both by the batch enrichment framework 134 (second stage enrichment) and the enrichment component 110 (first stage enrichment). These can for example be cloud services which can be queried based on the events to obtain relevant enrichment data. The enrichment data can be obtained by submitting queries to the micro services based on the content of the events. For example, enrichment data could be obtained by querying based on IP address (e.g. to obtain data about IP addresses known to be malicious), file name (e.g. to obtain data about malicious file names) etc.

Hunting Ground:

In addition to the case UI 126, a "hunting" UI 140 is provided via which the analyst can access recent events from the message queue 106. These can be events which have not yet made it to the observation delay line 116, but which have been subject to first stage enrichment and correlation at the event enhancement system 108. Copies of the events from the message queue 106 are stored in a hunting ground 142, which may be a distributed database and which can be queried via the hunting UI 140. This can for example be used by an analyst who has been alerted to a potential threat through the creation of a case that is made available via the case UI 126, in order to look for additional events that might be relevant to the potential threat.

In addition, copies of the raw network data itself, as obtained through tapping etc., are also selectively stored in a packet store 150. This is subject to filtering by a packet filter 152, according to suitable packet filtering criteria, where it can be accessed via the analyst device 130. An index 150a is provided to allow a lookup of packet data 150b, according to IP address and timestamps. This allows the analyst to trace back from events in the hunting ground to raw packets that relate to those events, for example.

It will be appreciated that, whilst the specific embodiments of the invention have been described, variants of the described embodiments will be apparent to the skilled person. The scope of the invention is not defined by the described embodiments but only by the appendant claims.

The invention claimed is:

1. A method of detecting security threats, the method comprising: receiving, at a data processing system, events relating to a monitored network, the events comprising (i) network events generated by monitoring network traffic within the network, and (ii) endpoint events generated using endpoint agents executed on endpoints of the monitored network to monitor local activity at those endpoints, wherein each of the network and endpoint events comprises: (i) event description data, (ii) an associated timestamp, and (iii) one or more related entity identifiers;

processing the network and endpoint events to link each of at least some of the endpoint events to at least one of the network events, based on the timestamps and the entity identifiers in those events; and analysing the events to detect security threat conditions indicated by the events, wherein at least one security threat condition is detected based on an endpoint event and a network event to which the endpoint event has been linked, wherein the analysis comprises creating, in an experience database, cases in response to the events, wherein at least some of the events are linked together by associating them with a common case.

2. The method according to claim 1, wherein at least some of the events are linked by joining the events together, in a joining phase performed prior to the analysis.

3. The method according to claim 1, wherein the case is populated with data of the events associated with it.

4. The method according to claim 1, wherein each case is assigned a threat score, the security threat conditions being detected based on the threat scores.

5. The method according to claim 1, comprising standardizing the events according to a predetermined data model.

6. The method according to claim 1, wherein the one or more related entity identifiers comprise one or more of: a network address, a user identifier, a device identifier, and an identifier of a process.

7. The method according to claim 1, wherein at least one of the endpoint events is linked to at least one of the network events based on respective network connection identifiers in those events.

8. The method according to claim 7, wherein the event description data of the at least one endpoint event associates at least one of the following with the network connection identifier: a socket on the endpoint, a host name of the endpoint, a process running on the endpoint, and a user account on the endpoint, which is thereby linked to the at least one network event.

9. The method according to claim 8, wherein the event description data of the endpoint event is thereby linked to the event description data of the network event, which denotes network activity associated with the identified network connection.

10. The method according to claim 7, wherein each of those events comprises multiple entity identifiers, which constitute the network connection identifier.

11. The method according to claim 10, wherein the multiple entity identifiers are in the form of a five-tuple formed of: a source IP address, a source port, a destination IP address, a destination port and a transport protocol.

12. The method according to claim 10, comprising hashing the multiple entity identifiers in the events to create respective identifier hashes, wherein the events are linked based on the identifier hashes.

13. A data processing system comprising:
least one input configured to receive events relating to a monitored network, the events comprising (i) network events generated by monitoring network traffic within the network, and (ii) endpoint events generated using endpoint agents executed on endpoints of the monitored network to monitor local activity at those endpoints, wherein each of the network and endpoint events comprises: (i) event description data, (ii) an associated timestamp, and (iii) one or more related entity identifiers at least one memory configured to store computer-readable instructions;
at least one hardware processor coupled to the at least one memory and configured to execute the computer-readable instructions, which upon execution cause the at least one hardware processor to:
process the network and endpoint events to link each of at least some of the endpoint events to at least one of the network events, based on the timestamps and the entity identifiers in those events; and
analyse the events to detect security threat conditions indicated by the events, wherein at least one security threat condition is detected based on an endpoint event and a network event to which the endpoint event has been linked, wherein at least one of the endpoint events is linked to at least one of the network events based on respective network connection identifiers in those events, the network connection identifier being a five-tuple formed of: a source IP address, a source port, a destination IP address, a destination port and a transport protocol.

14. The data processing system of claim 13, wherein the one or more processors are configured to link at least some of the events by joining the events together, in a joining phase performed prior to the analysis.

15. The data processing system of claim 13, wherein the analysis comprises creating, in an experience database, cases in response to the events, wherein at least some of the events are linked together by associating them with a common case.

16. The data processing system of claim 15, wherein the one or more processors are configured to populate the case with data of the events associated with it.

17. The data processing system of claim 15, wherein the one or more processors are configured to assign each case a threat score, the security threat conditions being detected based on the threat scores.

18. The data processing system of claim 13, wherein the one or more processors are configured to standardize the events according to a predetermined data model.

19. One or more non-transitory computer-readable media comprising instructions that, when executed on one or more processors, cause the one or more processors to:
receive events relating to a monitored network, the events comprising (i) network events generated by monitoring network traffic within the network, and (ii) endpoint events generated using endpoint agents executed on endpoints of the monitored network to monitor local activity at those endpoints, wherein each of the network and endpoint events comprises: (i) event description data, (ii) an associated timestamp, and (iii) one or more related entity identifiers;
process the network and endpoint events to link each of at least some of the endpoint events to at least one of the network events, based on the timestamps and the entity identifiers in those events; and
analyse the events to detect security threat conditions indicated by the events, wherein at least one security threat condition is detected based on an endpoint event and a network event to which the endpoint event has been linked, wherein at least one of the endpoint events is linked to at least one of the network events based on respective network connection identifiers in those events, wherein each of those events comprises multiple entity identifiers, which constitute the network connection identifier, the instructions causing the one or more processors to hash ng the multiple entity identifiers in the events to create respective identifier hashes, wherein the events are linked based on the identifier hashes.

* * * * *

UNITED STATES PATENT AND TRADEMARK OFFICE
CERTIFICATE OF CORRECTION

PATENT NO. : 12,212,582 B2
APPLICATION NO. : 17/130334
DATED : January 28, 2025
INVENTOR(S) : David Atkinson It is certified that error appears in the above-identified patent and that said Letters Patent is hereby corrected as shown below:

On the Title Page

In Column 1, Line 22, under Item (56) U.S. Patent Documents, delete "Pas et al." and insert --Das et al.--.

In Column 1, Line 38, under Item (56) U.S. Patent Documents, delete "Akhani et al." and insert --Lakhani et al.--.

In the Specification

In Column 12, Line 67, delete "over time" and insert --over time.--.

In the Claims

In Column 18, Claim 19, Line 42 (Approx.), delete "to hash ng the" and insert --to hash the--.

Signed and Sealed this
Thirteenth Day of May, 2025

Coke Morgan Stewart
*Acting Director of the United States Patent and Trademark Office*